(12) United States Patent
Kokubun et al.

(10) Patent No.: US 6,486,634 B2
(45) Date of Patent: Nov. 26, 2002

(54) VEHICLE USE CHARGING GENERATOR

(75) Inventors: Shuuichi Kokubun, Naka-machi (JP); Sakae Hikita, Hitachinaka (JP); Shouju Masumoto, Hitachiohta (JP); Yoshiaki Honda, Hitachinaka (JP)

(73) Assignees: Hitachi, Ltd., Tokyo (JP); Hitachi Car Engineering Co., Ltd., Hitachinaka (JP)

( * ) Notice: Subject to any disclaimer, the term of this patent is extended or adjusted under 35 U.S.C. 154(b) by 0 days.

(21) Appl. No.: 09/790,552

(22) Filed: Feb. 23, 2001

(65) Prior Publication Data

US 2001/0017530 A1 Aug. 30, 2001

(30) Foreign Application Priority Data

Feb. 25, 2000 (JP) ........................................ 2000-050032

(51) Int. Cl.[7] .................................................. H02J 7/00
(52) U.S. Cl. ...................................................... 320/104
(58) Field of Search ................................. 320/104, 123, 320/137; 361/20; 322/37, 28

(56) References Cited

U.S. PATENT DOCUMENTS 4,346,338 A * 8/1982 Nakamoto et al. .......... 320/137
4,513,239 A * 4/1985 Morishita et al. ........... 320/123
4,549,128 A * 10/1985 Morishita et al. ........... 320/123
5,528,444 A * 6/1996 Cooke et al. .................. 361/20
5,714,851 A * 2/1998 Antony et al. ............... 318/148
5,719,488 A * 2/1998 Mashino et al. ............... 322/28
5,929,610 A * 7/1999 Friedlander et al. .......... 322/37

FOREIGN PATENT DOCUMENTS

| JP | 8-65914 | 3/1996 |
| JP | 10-66319 | 3/1998 |
| JP | 11-215899 | 8/1999 |
| JP | 11-346499 | 12/1999 |

* cited by examiner

Primary Examiner—Edward H. Tso
Assistant Examiner—Pia Tibbits
(74) Attorney, Agent, or Firm—Crowell & Moring LLP (57) ABSTRACT

To provide a vehicular charging and generating system capable of issuing alarm to a driver even when failure is caused in a rectifying apparatus of the vehicular charging and generating system, failure detecting means issues alarm when a difference between an output voltage of generated voltage detecting means and an output voltage of average phase voltage detecting means is higher than first difference voltage set when failure is not caused in a rectifying element or when the difference is lower than second difference voltage set when failure is not caused in the rectifying element.

5 Claims, 7 Drawing Sheets

VEHICLE USE CHARGING GENERATOR

BACKGROUND OF THE INVENTION

1. Field of the Invention

The present invention relates to a vehicular charging and generating system, particularly to a vehicular charging and generating system driven by an engine for generating electricity.

2. Description of the Related Art

According to a conventional vehicular charging and generating system, rotational force of an engine is transmitted to a rotor via a belt, a rotating field coil is rotated and a rotating magnetic field is generated. Further, three phase alternating current voltage generated at an armature coil by. the rotating magnetic field is rectified by a full wave rectifier and by the rectified output voltage, a battery is charged at the constant voltage.

Hence, according to the conventional vehicular charging and generating system, for example, as described in Japanese Unexamined Patent Publication No. H9-710, it is known that when the generator is brought into a state of stopping to generate electricity by some cause, for example the generator is brought into the state of stopping to generate electricity since the field coil is disconnected, an Driver is informed thereof by issuing alarm.

However, according to the conventional vehicular charging and generating system, when a portion of a plurality of rectifying elements of the full wave rectifier is failed, since the generator can generate electricity, alarm is not issued and the driver cannot be informed of the abnormality of the generator.

SUMMARY OF THE INVENTION

It is an object of the present invention to provide a vehicular charging and generating system capable of alarming a driver even when a failure is caused in a rectifying apparatus of the vehicular charging and generating system.

(1) In order to achieve the above-described object, according to an aspect of the invention, there is provided a vehicular charging and generating system having a full wave rectifier for rectifying alternating current output voltage of an armature coil for outputting alternating current voltage to direct current voltage, the vehicular charging and generating system comprising failure detecting means for detecting a failure of a rectifying element constituting the rectifier, wherein an alarm is issued when the failure of the rectifying element is detected by the failure detecting means.

By such constitution, even when the failure is caused in the rectifying apparatus, the alarm can be issued to the driver.

(2) In the above-described (1), preferably, the failure detecting means detects the failure of the rectifying element by comparing generated voltage of the vehicular charging generator and average voltage of phase voltage of the armature coil.

(3) In the above-described (2), preferably, there are further provided generated voltage detecting means for detecting the generated voltage of the vehicular charging generator, and average phase voltage detecting means for detecting the average voltage of the phase voltage of the armature coil, wherein the failure voltage detecting means issues an alarm when a difference between output voltage of the generator voltage detecting means and output voltage of the average phase voltage detecting means is higher than first difference voltage set when the failure is not caused in the rectifying element or when the difference is lower than second difference voltage set when the failure is not caused in the rectifying element.

(4) In the above-described (3), preferably, there is provided delaying means for issuing the alarm after a set time period when the difference output voltage exceeds the first or the second set difference voltage.

(5) In the above-described (3), preferably, there is provided rotational number detecting means for alarming the failure when a rotational number of the generator is equal to or larger than a set rotational number.

Other objects, advantages and novel features of the present invention will become apparent from the following detailed description of the invention when considered in conjunction with the accompanying drawings.

BRIEF DESCRIPTION OF THE DRAWINGS

FIGS. 8A and 8B are waveform diagrams showing voltage waveforms of respective portions when a rectifying element of a full wave rectifier is failed in which FIG. 8A shows voltage waveforms of terminal B and respective phases of U phase, V phase and W phase in normal operation and FIG. 8B shows voltage waveforms of terminal B and respective phases of U phase, V phase and W phase when a W phase positive electrode side rectifying element is opened and broken.

DETAILED DESCRIPTION OF THE PREFERRED EMBODIMENTS

An explanation will be given of a vehicular charging and generating system according to an embodiment of the present invention in reference to FIG. 1 through FIG. 9 as follows.

An explanation will be given of a total constitution of a vehicular charging and generating system according to the embodiment in reference to FIG. 1.

Figure 1:
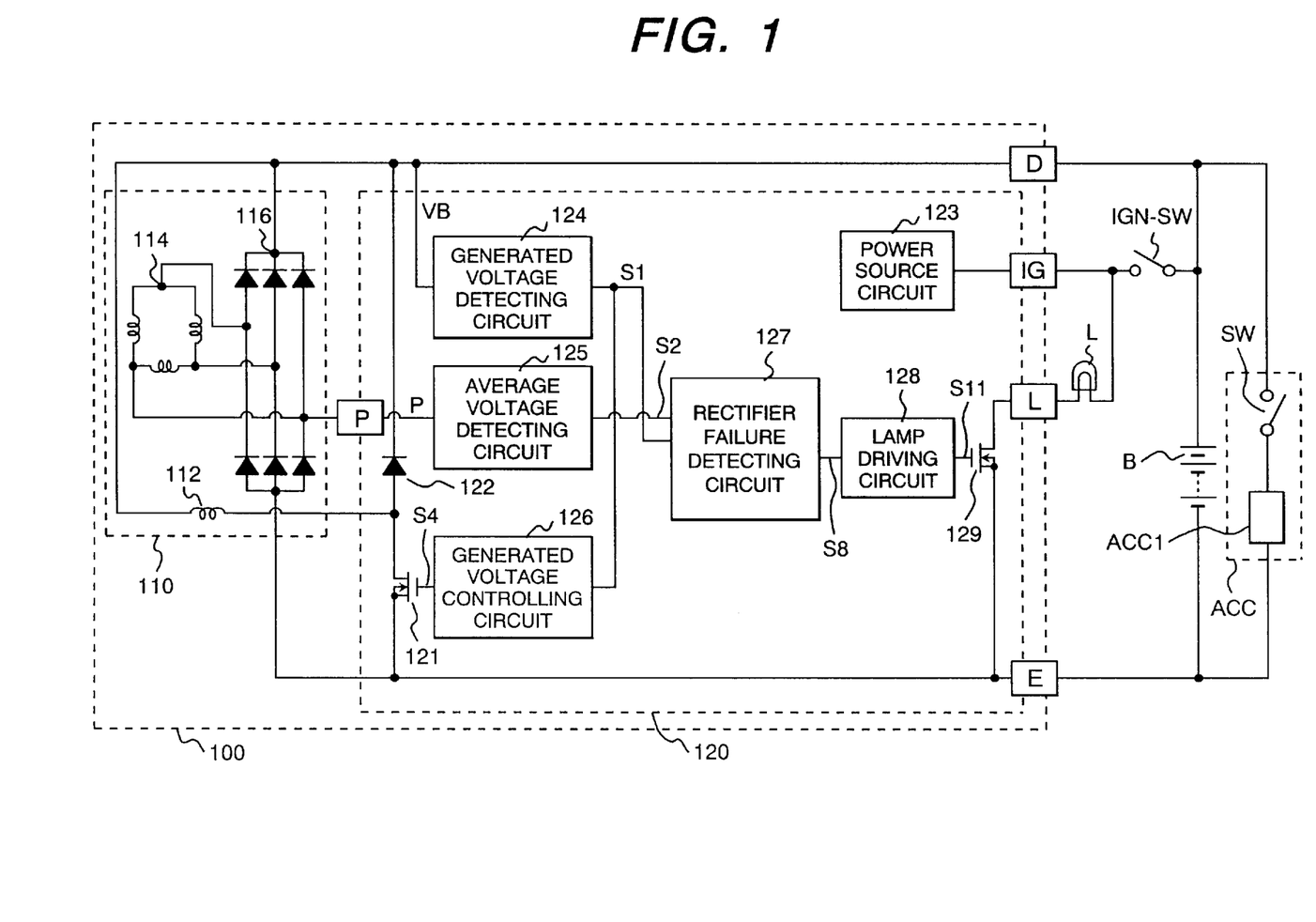
FIG. 1 is a block diagram showing a total constitution of a vehicular charging and generating system according to an embodiment of the present invention.

FIG. 1 is a block diagram showing a total constitution of a vehicular charging and generating system according to an embodiment of the present invention.

The vehicular charging and generating system 100 according to the embodiment is provided with a vehicular charging generator 110 and a control apparatus 120. The vehicular charging and generating system 100 is connected with an alarm lamp L, a battery B, an accessory ACC and an ignition switch IGN-SW. Abnormality of a rectifier of the vehicular charging generator 110 is detected by the control apparatus 120 and is alarmed to a driver by emitting light by the alarm lamp L. Power generated by the vehicular charging generator 110 is charged to the battery B. Generated voltage of the charging generator 110 is controlled by the control apparatus 120. The accessory ACC is provided with an accessory ACC1 such as an air conditioner or a car stereo and a switch SW1 for making ON/OFF the accessory ACC1.

The vehicular charging generator 110 is provided with a field coil 112, an armature coil (stator coil) 114 and a three phase full wave rectifier 116. The field coil 112 is attached to a rotor (not illustrated) rotating in synchronism with a rotational number of an engine and generates a rotating magnetic field. The armature coil 114 is attached to a stator core (not illustrated) opposed to the rotor with a gap therebetween and generates three phase alternating current voltage by receiving the rotating magnetic field generated by the field coil 112. The three phase full wave rectifier 116 subjects the three phase alternating current voltage outputted from the armature coil 114 to full wave rectification and is constituted by two pieces of rectifying elements for respective phase, that is a total of six pieces of rectifying elements.

Further, the control apparatus 120 is provided with switching means 121, a flywheel diode 122, a power source circuit 123, a generated voltage detecting circuit 124, an average voltage detecting circuit 125, a generated voltage controlling circuit 126, a rectifier failure detecting circuit 127, a lamp driving circuit 128 and a transistor 129.

The switching means 121 is for controlling field current flowing in the field coil 112 and is constituted by a power transistor. The flywheel diode 122 is connected in parallel with the field coil 112 and absorbs counter electromotive force generated in cutting the switching means 121. The power source circuit 123 is for supplying power source voltage of the control apparatus 120 and a description will be given later of details thereof in reference to FIG. 2. The generated voltage detecting circuit 124 is for detecting generated voltage of the generator 110 and a description will be given details thereof in reference to FIG. 3. The average voltage detecting circuit 125 is for detecting average voltage of phase voltage of the armature coil 114 and a description will be given of details thereof in reference to FIG. 4. The generated voltage controlling circuit 126 is for controlling generated voltage at a constant voltage by controlling the switching means 121 and a description will be given of details thereof in reference to FIG. 5. The rectifier failure detecting circuit 127 is for detecting presence or absence of failure of the rectifier 116 and a description will be given later of details thereof in reference to FIG. 6. The lamp driving circuit 128 is for driving the transistor 129 and a description will be given later of details thereof in reference to FIG. 7. The transistor 129 is for turning on or turning off the alarm lamp L.

Figure 2:
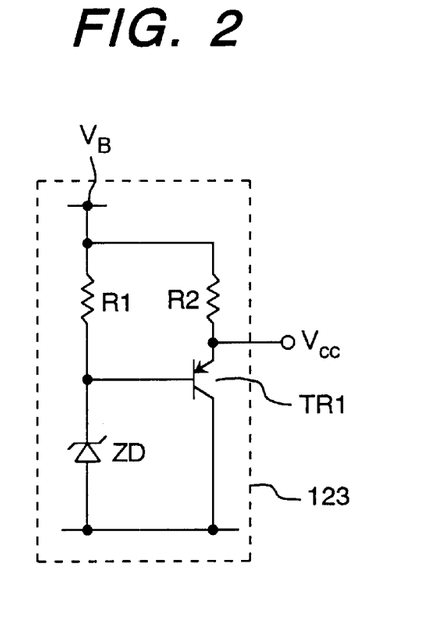
FIG. 2 is a circuit diagram showing a constitution of a power source circuit used in a control apparatus of the vehicular charging and generating system according to the embodiment of the present invention.

Here, an explanation will be given of a circuit constitution of the power source circuit 123 used in the control apparatus of the vehicular charging and generating system according to the embodiment.

FIG. 2 is a circuit diagram showing the constitution of the power source circuit 123 used in the control apparatus of the vehicular charging generator according to the embodiment of the present invention.

The power source circuit 123 is constituted of a zener diode ZD, resistors R1 and R2 and a PNP transistor TR1. A series circuit of the zener diode ZD and the resistor R1 is connected to voltage VB of the battery B. A middle point of connecting the zener diode ZD and the resistor R1, is connected with the base of the PNP transistor TR1. The emitter of the transistor TR1 is connected to other end of the resistor R1 via the resistor R2 and power source voltage Vcc of the control circuit 120 is outputted from the emitter. Further, the collector of the transistor TR1 is grounded.

Next, an explanation will be given of a circuit constitution of the voltage detecting circuit 124 used in the control apparatus of the vehicular charging and generating system according to the embodiment in reference to FIG. 3.

Figure 3:
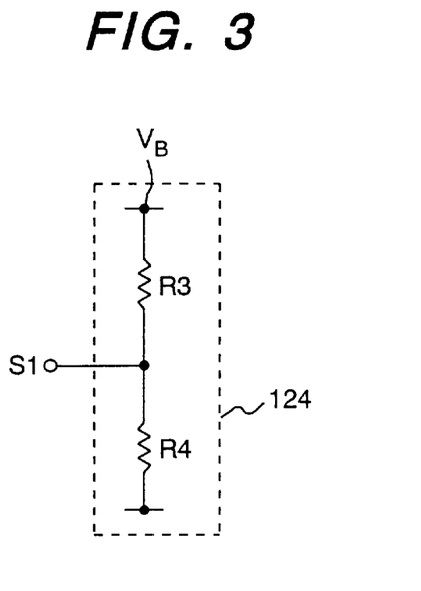
FIG. 3 is a circuit diagram showing a constitution of a voltage detecting circuit used in the control apparatus of the vehicular charging and generating system according to the embodiment of the present invention.

FIG. 3 is a circuit diagram showing a constitution of the voltage detecting circuit 124 used in the control apparatus of the vehicular charging and generating system according to the embodiment of the present invention.

The voltage detecting circuit 124 is constituted of resistors R3 and R4 connected in series. The generated voltage VB of the generator is divided by the resistors R3 and R4 and an output signal S1 is outputted from a point of connecting the resistor R3 and the resistor R4.

Next, an explanation will be given of a circuit constitution of the average voltage detecting circuit 125 used in the control apparatus of the vehicular charging and generating system according to the embodiment in reference to FIG. 4.

Figure 4:
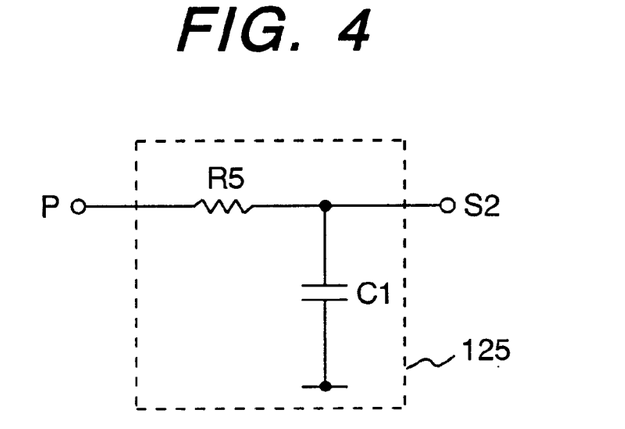
FIG. 4 is a circuit diagram showing a constitution of an average voltage detecting circuit used in the control apparatus of the vehicular charging and generating system according to the embodiment of the present invention.

FIG. 4 is a circuit diagram showing a constitution of the average voltage detecting circuit 125 used in the control apparatus of the vehicular charging and generating system according to the embodiment of the present invention.

The average phase voltage detecting circuit 125 is a smoothing circuit constituted of a resistor R5 and a condenser C1. When one phase voltage P of the armature coil 114 is inputted, the voltage P is smoothed by the condenser C1 via the resistor R5 and an average phase voltage signal S2 is outputted from a point of connecting the resistor R5 and the condenser C1.

Next, an explanation will be given of a circuit constitution of the generate voltage controlling circuit 126 used in the control apparatus of the vehicular charging and generating system according to the embodiment in reference to FIG. 5.

Figure 5:
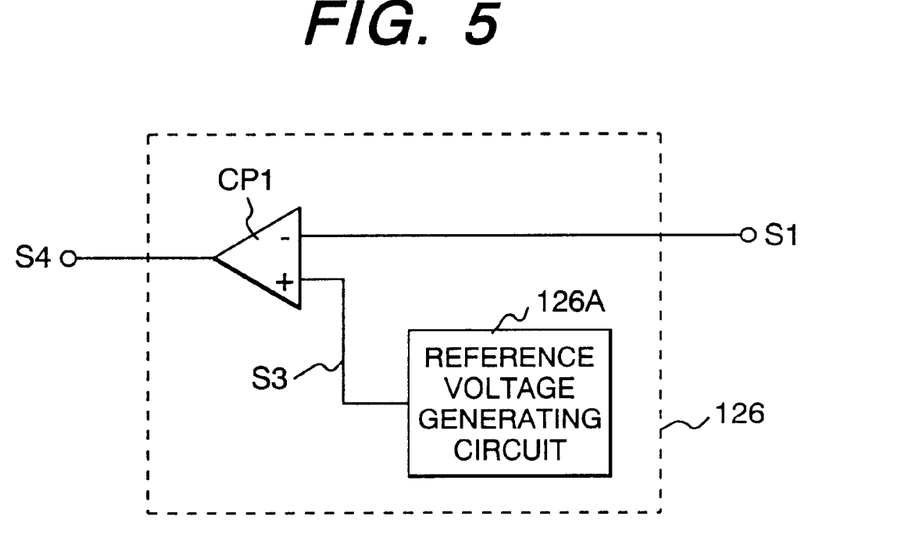
FIG. 5 is a circuit diagram showing a constitution of a generated voltage controlling circuit used in the control apparatus of the vehicular charging and generating system according to the embodiment of the present invention.

FIG. 5 is a circuit diagram showing a constitution of the generated voltage controlling circuit 126 used in the control apparatus of the vehicular charging and generating system according to the embodiment.

The generated voltage controlling circuit 116 is constituted of a reference voltage generating circuit 126A and a comparator CP1. The reference voltage generating circuit 126A generates a reference voltage signal S3 for controlling the generated voltage at constant voltage. The comparator CP1 compares a voltage detecting signal S1 outputted by the generated voltage detecting circuit 124 and the reference voltage signal S3 outputted from the reference voltage generating circuit 126A and outputs a field current control signal S4.

Next, an explanation will be given of a circuit constitution of the rectifier failure detecting circuit 127 used in the control apparatus of the vehicular charging and generating system according to the embodiment in reference to FIG. 6.

Figure 6:
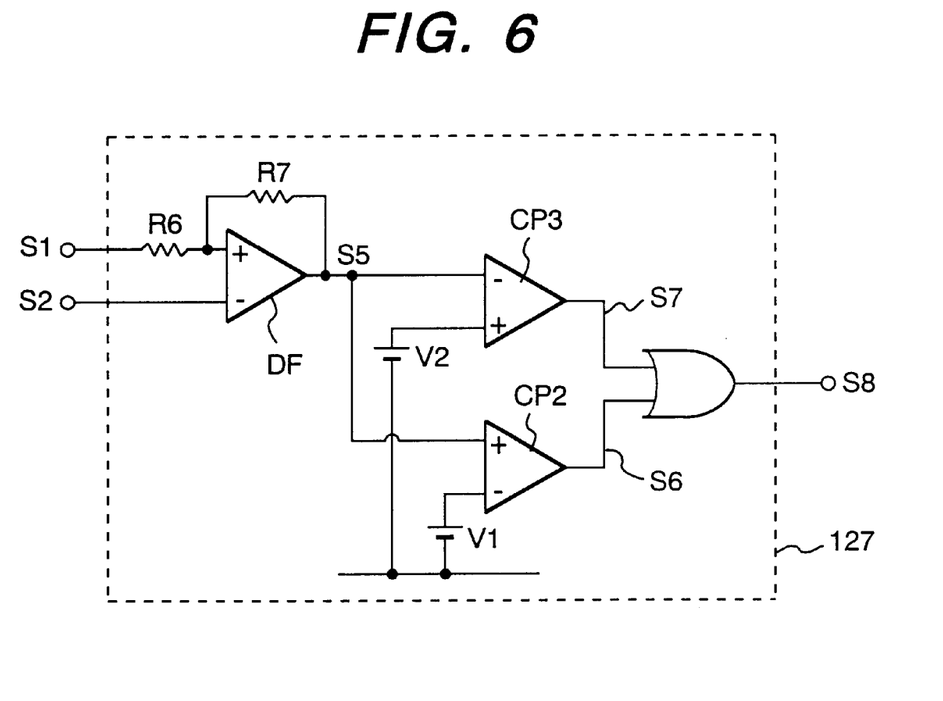
FIG. 6 is a circuit diagram showing a constitution of a rectifier failure detecting circuit used in the control apparatus of the vehicular charging and generating system according to the embodiment of the present invention.

FIG. 6 is a circuit diagram showing a constitution of the rectifier failure detecting circuit 127 used in the control apparatus of the vehicular charging and generating system according to the embodiment of the present invention.

The rectifier failure detecting circuit 127 is constituted of a differencing circuit DF, comparators CP2 and CP3 and an OR circuit OR1. The differencing circuit DF calculates a difference between the generated voltage detecting signal S1 inputted via a resistor R6 and the average phase voltage detecting signal S2 and outputs an output signal S5. The comparator CP2 compares the output signal S5 of the differencing circuit DF and a reference voltage signal V1 and outputs an output signal S6 of "Hi" level when the output signal S5 is higher than the reference voltage signal V1. The comparator CP3 compares the output signal of the differencing circuit DF and a reference voltage signal V2 and outputs an output signal S7 of "Hi" level when the output signal S5 is lower than the reference voltage signal V2. The OR circuit OR1 outputs a signal S8 which is a logical sum of the output signal S6 of the comparator CP2 and the output signal S7 of the comparator CP3. That is the rectifier failure detecting circuit 127 is constituted to output the output signal S8 of "Hi" level only when the output signal S5 of the differencing circuit DF is higher than the reference voltage signal V1 or when the output signal S5 of the differencing circuit DF is lower than the reference voltage signal V2.

Next, an explanation will be given of a circuit constitution of the lamp driving circuit 128 used in the control apparatus of the vehicular charging and generating system according to the embodiment in reference to FIG. 7.

Figure 7:
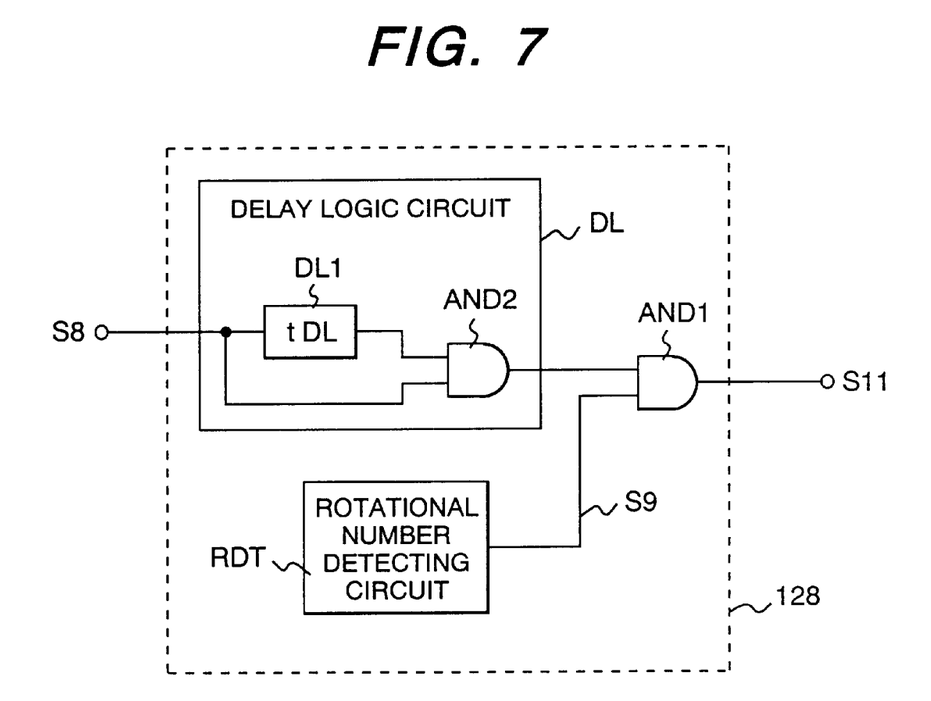
FIG. 7 is a circuit diagram showing a constitution of a lamp driving circuit used in the control apparatus of the vehicular charging and generating system according to the embodiment of the present invention.

FIG. 7 is a circuit diagram showing a constitution of the lamp driving circuit 128 used in the control apparatus of the vehicular charging and generating system according to the embodiment of the present invention.

The lamp driving circuit 128 is constituted of a rotational number detecting circuit RDT, a delay logic circuit DL and an AND circuit AND1. The rotational number detecting circuit RDT outputs an output signal S9 of "Hi" level when the rotational number of the generator 110 is equal to or larger than a set rotational number. The delay logic circuit DL is constituted of a delay circuit DL1 and a logical product circuit AND2 and outputs a delay logic signal S10 of "Hi" level after a predetermined time period from when the output signal S8 of the rectifier failure detecting circuit 127 becomes "Hi" level. The AND circuit AND1 outputs an output signal S11 which is a logical product of the rotational number detecting signal S9 and the delay logic signal S10. When the AND signal S11 is at "Hi"level, the transistor 129 is conducted, the alarm lamp L is turned on and alarm is issued.

Next, an explanation will be given of operation of the vehicular charging and generating system according to the embodiment in reference to FIGS. 8A and 8B and FIG. 9.

At first, an explanation will be given of voltage waveforms of respective portions when a rectifying element of the full wave rectifier is failed in reference to FIGS. 8A and 8B.

Figure 8A:
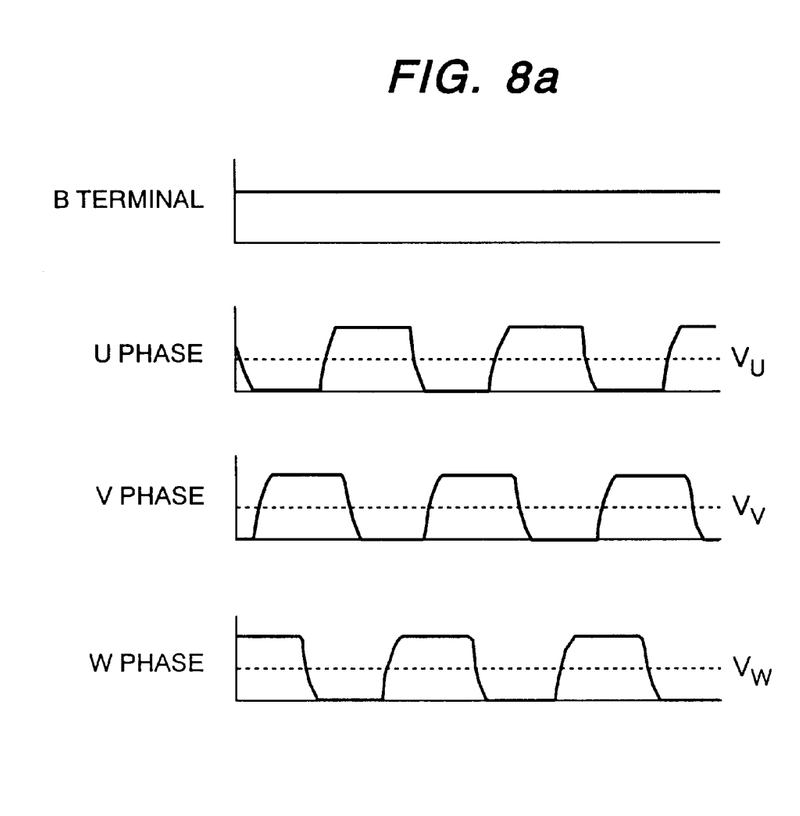
Figure 8B:
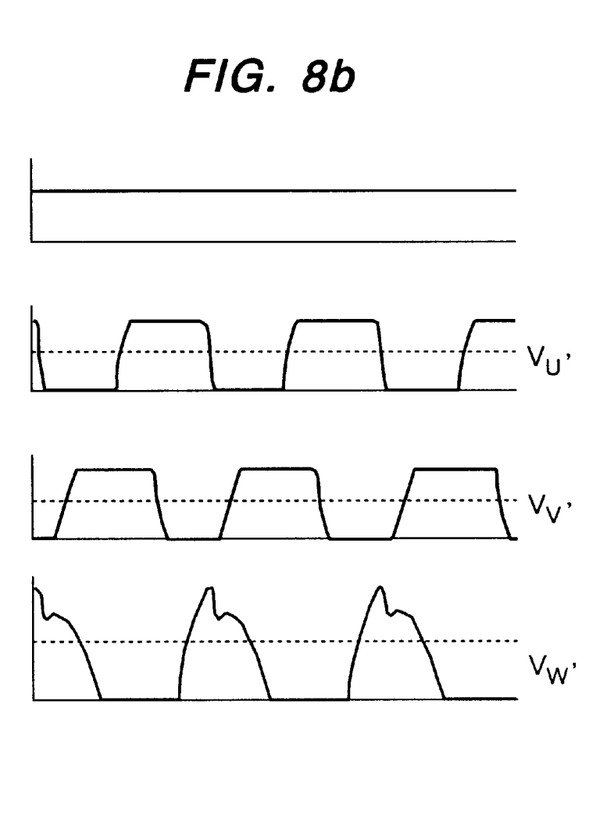

FIGS. 8A and 8B are waveform diagram showing voltage waveforms of respective portions when a rectifying element of the full wave rectifier is failed, FIG. 8A shows voltage waveforms of terminal B and the respective phases of U phase, V phase and W phase in normal operation and FIG. 8B shows voltage waveforms of terminal B and respective phases of U phase, V phase and W phase when a W phase positive electrode side rectifying element is opened and broken.

In normal time, as shown by FIG. 8A, the respective phase voltage waveforms of U phase, V phase and W phase become the same waveform. However, when, for example, the W phase positive electrode side rectifying element of the full wave rectifier 116 is opened and broken by some cause, as shown by FIG. 8B, there causes unbalance in the respective phase voltage of the armature coil 114 and the average voltage of the respective phase voltage is elevated or lowered. For example, when + side of the rectifying element is opened or short-circuited, the average voltage of the respective phase voltage is elevated. FIG. 8B shows the case of elevating the average voltage, the W phase voltage is elevated from the average voltage Vw to the average voltage vw', similarly, the V phase voltage is elevated from the average voltage Vv to the average voltage Vv' and the U phase voltage is elevated from the average voltage Vu to the average voltage Vu'. When the terminal B voltage is +14 V, an amount of elevating the average voltage is about +1.0 V. Further, when – side of the rectifying element is opened or short-circuited, the average voltage of the respective phase voltage is lowered. An amount of lowering the average voltage is about –1.0 V. Meanwhile, the voltage waveform of the output terminal (terminal B) of the vehicular charging generator 110 stays the same waveform in normal operation since the battery B is connected in parallel between the output terminal (terminal B) of the vehicular charging generator 110 and the ground.

Next, an explanation will be given of operation of the vehicular charging and generating system according to the embodiment in reference to FIG. 9.

Figure 9:
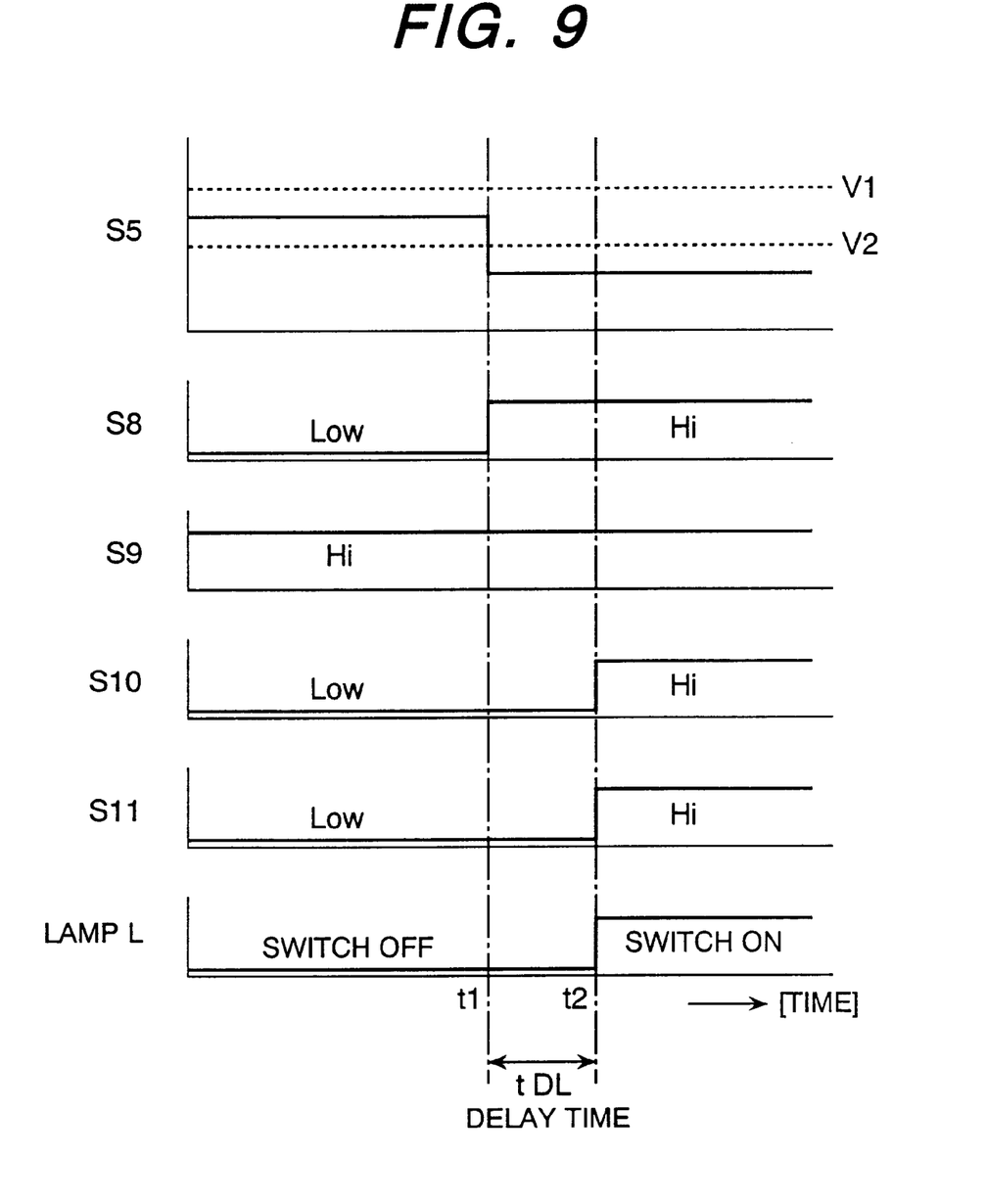
FIG. 9 is a waveform diagram showing operation of the vehicular charging and generating system according to the embodiment of the-present invention.

FIG. 9 is a waveform diagram showing operation of the vehicular charging and generating system according to the embodiment of the invention.

When the ignition switch IGN-SW is made ON and an internal combustion engine begins to start, the rotor (not illustrated) starts rotating in synchronism therewith and alternating current power is generated in the armature coil 114. Generated alternating current power is rectified to direct current by the full wave rectifier 116 and is supplied to the battery B and the accessory ACC. At this occasion, when the vehicular charging generator 110 becomes capable of charging electricity to the battery B and the accessory ACC, the transistor 129 is changed from a conductive state to a cut state and the alarm lamp L is brought into OFF state from ON state. The vehicular charging and generating system starts normal power generation.

At this occasion, when a failure is caused in the rectifying element of the full wave rectifier 16, as has been explained in reference to FIG. 8B, unbalance is caused in the respective phase voltage of the armature coil 114 and the average voltage of the phase voltage is elevated. Therefore, when the output signal S5 of the difference between the generated voltage detecting signal S1 and the average phase voltage detecting signal S2, exceeds the reference voltage V2 of the rectifier failure detecting circuit 127 at time t1, the output signal S8 of the OR circuit OR1 is changed from "Low" level to "Hi" level. The output signal S8 is subjected to delay logic by a constant delay. logic time period tDL by the delay logic circuit DL of the lamp driving circuit 128 and the output signal S10 of the delay logic circuit DL is changed from "Low" level to "Hi" level. The output signal S11 is produced by logical product of the output signal S10 of the delay logic circuit DL and the output signal S9 of the rotational number detecting circuit RDT and accordingly, the output signal S11 is changed from "Low" level to "Hi" level. As the result, the transistor 129 for driving the lamp is brought into the conductive state from the cut state, the lamp L is turned on and alarm is issued. Further, when the rotational number of the generator does not reach a constant rotational number, the output signal S9 of the rotational number detecting circuit RD is at "Low" level and therefore, the lamp is not turned on.

Further, when a failure is caused in the rectifying element of the wave rectifier 116, unbalance is caused in the respective phase voltage of the armature coil 114 and the average voltage of the respective phase voltage is lowered, the difference output signal S5 exceeds the reference voltage V1 of the rectifier failure detecting circuit 127 and the output signal S8 of the OR circuit OR1 is changed from "Low" level to "Hi" level. The output signal S8 is subjected to delay logic by the constant delay logic time period tDL by the delay logic circuit DL of the lamp driving circuit 128 and the output signal S10 of the delay logic circuit DL is changed from "Low" level to "High" level. As a result, the lamp driving transistor 129 is brought into the conductive state from the cut state, the lamp L is turned on and alarm is issued.

Further, according to the above-described explanation, there is detected a failure of the rectifying element by the average voltage of a single phase of the rectifying element of in three phases of the rectifying elements and at the same time, as has been explained in reference to FIG. 8B, when any one phase of rectifying element in three phases of the rectifying elements is failed, the average voltage of other phase is also elevated and accordingly, the failure can be detected even when the rectifying element other than the detected phase is failed.

Further, the delay logic circuit DL is constituted of the delay circuit DL1 and the logic product circuit AND2. Even when disturbance is inputted to the detecting portion by some cause and the output of the delay circuit DL 1 becomes "Hi" level, if the disturbance is started at that time, the output of the logic product circuit AND2 stays to be at "Low" level and accordingly, erroneous alarming can be prevented.

As has been explained, according to the embodiment, even when failure is caused in the rectifying apparatus of the vehicular charging and generating system, failure can be detected and alarm can be issued.

Further, since the delay logic time period is provided from when failure occurrence is detected until alarm is issued and therefore, even when disturbance is inputted to the detecting portion by some cause, erroneous alarming can be prevented.

Therefore, alarm is issued when short-circuit or open failure is caused in the rectifying element of the vehicular charging and generating system, it can be prevented beforehand that the engine is abruptly stopped by discharging the battery.

According to the present invention, even when failure is caused in the rectifying apparatus of the vehicular charging and generating system, alarm can be issued to the driver.

The foregoing disclosure has been set forth merely to illustrate the invention and is not intended to be limiting.

Since modifications of the disclosed embodiments incorporating the spirit and substance of the invention may occur to persons skilled in the art, the invention should be construed to include everything within the scope of the appended claims and equivalents thereof.

What is claimed is:

1. A vehicular charging and generating system having a full wave rectifier for rectifying an alternating current output voltage of an armature coil for outputting an alternating current voltage to a direct current voltage, said vehicular charging and generating system comprising:

failure detecting means for detecting a failure of a rectifying element constituting the rectifier;

wherein the failure detecting means detects the failure of the rectifying element by comparing a generated voltage of the vehicular charging generator and an average voltage of a phase voltage of the armature coil.

2. The vehicular charging and generating system according to claim 1:

wherein an alarm is issued when the failure of the rectifying element is detected by the failure detecting means.

3. A vehicular charging and generating system having a full wave rectifier for rectifying an alternating current output voltage of an armature coil for outputting an alternating current voltage to a direct current voltage, said vehicular charging and generating system comprising:

a failure detecting means for detecting a failure of a rectifying element constituting the rectifier;

generated voltage detecting means for detecting the generated voltage of the vehicular charging generator; and an average phase voltage detecting means for detecting the average voltage of the phase voltage of the armature coil;

wherein the failure voltage detecting means issues an alarm when a difference between an output voltage of the generator voltage detecting means and an output voltage of the average phase voltage detecting means is higher than a first difference voltage set when the failure is not caused in the rectifying element or when the difference is lower than a second difference voltage set when the failure is not caused in the rectifying element.

4. The vehicular charging and generating system according to claim 3, further comprising:

delaying means for issuing the alarm after a set time period when the difference output voltage exceeds the first or the second set difference voltage.

5. The vehicular charging and generating system according to claim 3, further comprising:

rotational number detecting means for alarming the failure when a rotational number of the generator is equal to or larger than a set rotational number.

* * * * *